United States Patent [19]

Williams

[11] Patent Number: 4,723,371
[45] Date of Patent: Feb. 9, 1988

[54] SELF SUPPORTED, COLLAPSIBLE, AND PORTABLE WALLED STRUCTURE SUITABLE FOR USE AS A HUNTING BLIND

[76] Inventor: Douglas C. Williams, 1283 E. Beverly Way, Bountiful, Utah 84010

[21] Appl. No.: 869,221

[22] Filed: Jun. 2, 1986

[51] Int. Cl.$^4$ ............................................. A01M 31/02
[52] U.S. Cl. ........................................................ 43/1
[58] Field of Search ...................... 43/1; 135/102, 104, 135/105, 97, 117, 901

[56] References Cited

U.S. PATENT DOCUMENTS

| | | | |
|---|---|---|---|
| 1,892,378 | 12/1932 | Bernstein | 135/97 |
| 2,970,600 | 2/1961 | Schultz | 135/107 |
| 3,323,530 | 6/1967 | Smith . | |
| 3,406,784 | 10/1968 | Jones . | |
| 3,441,037 | 4/1969 | Transeau | 135/97 |
| 3,540,170 | 11/1970 | Flowers | 135/901 |
| 3,609,905 | 10/1971 | Fuhrman . | |
| 3,622,201 | 11/1971 | Radig . | |
| 3,629,875 | 12/1971 | Dow | 135/902 |
| 3,642,318 | 2/1972 | Avant . | |
| 3,690,334 | 9/1972 | Miller . | |
| 3,744,842 | 7/1973 | Ronning . | |
| 3,848,352 | 11/1974 | Sayles . | |
| 3,874,396 | 4/1975 | Kirkham . | |
| 3,874,398 | 4/1975 | Hendrickson . | |
| 3,886,678 | 6/1975 | Caccamo . | |
| 3,902,264 | 9/1975 | Radig . | |
| 3,913,598 | 10/1975 | Glutting . | |
| 3,936,969 | 2/1976 | Richard . | |
| 4,068,674 | 1/1978 | Mitchell | 135/117 |
| 4,102,352 | 7/1978 | Kirkham . | |
| 4,164,089 | 8/1979 | George . | |
| 4,171,595 | 10/1979 | Tucker . | |
| 4,186,507 | 2/1980 | Stinnett . | |
| 4,224,754 | 9/1980 | Derryberry . | |
| 4,236,543 | 12/1980 | Moss | 135/105 |
| 4,364,193 | 12/1982 | Visco . | |
| 4,388,939 | 6/1983 | Barton . | |
| 4,412,398 | 11/1983 | Harmon . | |
| 4,483,090 | 11/1984 | Carper . | |

OTHER PUBLICATIONS

Johnny Stewart Advertising Sheet.
Intruder II Advertising Brochure.
Porta-Mac Advertising Sheet.
Baker Ground Blinds Advertising Sheet.
Insta Blinds Advertising Brochure.
Hide um Hunter Advertising Brochure.
Blind, Game Bag Yardage and Tents Advertising Sheet.
Thomas Advertising Brochure.
Apache Tri-Pod Advertising Brochure.

Primary Examiner—M. Jordan
Attorney, Agent, or Firm—Robert R. Mallinckrodt; Philip A. Mallinckrodt

[57] ABSTRACT

A portable, collapsible, walled structure suitable for use as a hunting blind to hide a hunter, nature observer, or photographer from view of animals being hunted, watched, or photographed, includes a plurality of resilient poles bent into stressed, arcuate shapes with ends thereof secured to a base member defining the perimeter of the structure and with flexible sheeting material held between the base members and the resilient poles to form substantially vertical walls for the structure. The structure has an open unobstructed top, and preferably an open bottom so that the structure may be used in marshy areas or in shallow water areas.

19 Claims, 15 Drawing Figures

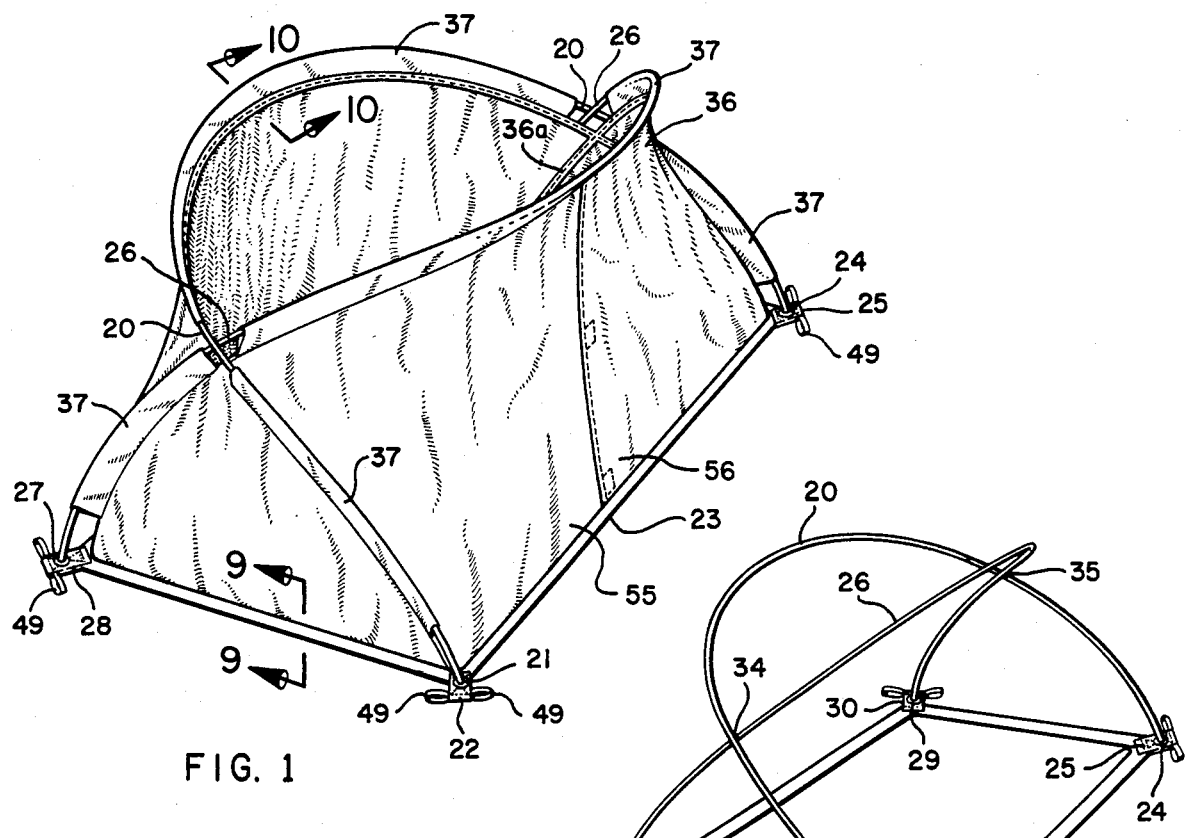
FIG. 1
FIG. 2
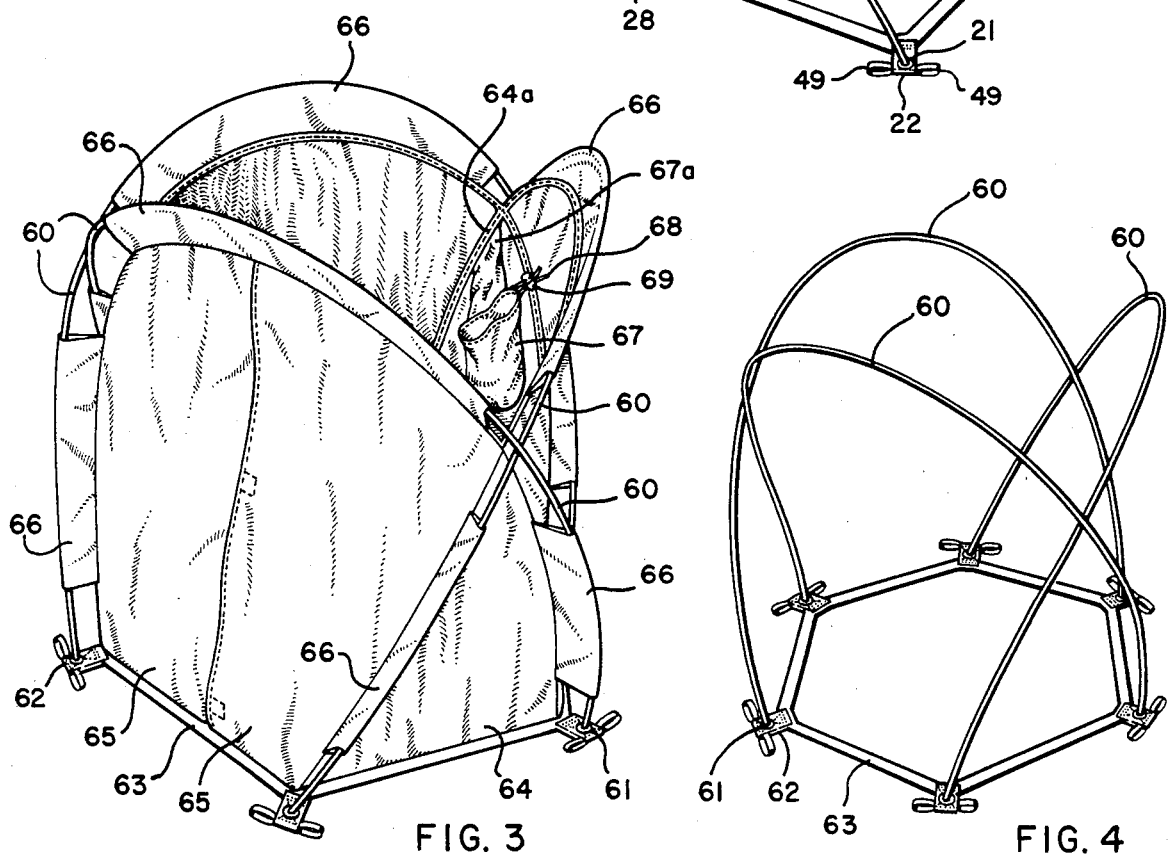
FIG. 3
FIG. 4

4,723,371

SELF SUPPORTED, COLLAPSIBLE, AND PORTABLE WALLED STRUCTURE SUITABLE FOR USE AS A HUNTING BLIND

BACKGROUND OF THE INVENTION

1. Field

The invention is in the field of portable hunting blinds for use by a hunter, nature observer, or photographer to hide the user from view of the animals being hunted, watched, or photographed.

2. State of the Art

There are numerous portable hunting blinds currently on the market for hiding a hunter or photographer from animals being hunted or photographed. These currently available blinds take many forms from poles with seats thereon to be attached to trees to hold the hunter above the ground to collapsible frames which fold into rectangular or other shape to form a frame for camouflage material behind or inside of which the hunter hides. These frames take various forms but are generally bulky and heavy in order to provide the strength needed for the frame to retain its shape and form a stable structure. There remains a need for a portable hunting blind which is light, compact in collapsed condition so is easily portable, sets up easily, is self-supporting on any type of terrain, and offers effective concealment for hunters using the blind.

In recent years, a variety of tents have become available which utilize resilient poles which may be bent into an arc to provide support for the tent material. However, the fabric tent material forms a completely closed structure with unitary top and floor which provide a critical and necessary part of the overall support for shaping and stabilizing the resilient poles. Further, the poles generally pass over at least a portion of the top of the tent. In most instances it will not be desirable for a hunting blind to have a closed top or floor, and, in general, tents are not generally usable as hunting blinds.

SUMMARY OF THE INVENTION

According to the invention, a portable, collapsible, walled structure suitable for use as a hunting blind includes a plurality of resilient members bent into arcuate shapes with ends thereof secured to a base member which defines the perimeter of the structure and holds the resilient members in bent condition. Flexible sheet material is secured to at least a portion of the base member and has means securing it to the resilient members to form walls of the structure and to stabilize the resilient members and hold them in position relative to the base member, the sheeting material, and to each other to thereby leave the top of the structure open and unobstructed by the resilient members and sheet material. In this way, a self supporting, walled structure is provided with an open top and preferably an open bottom.

THE DRAWINGS

In the figures, which illustrate the presently preferred structure for carrying out the invention in actual practice:

FIG. 1 is a pictorial view of a two pole embodiment of a hunting blind of the invention;

FIG. 2, a view similar to that of FIG. 1 but showing the sheeting material forming the walls removed so the configuration of the poles and base member is clearly visible;

FIG. 3, a pictorial view of a three pole embodiment of a hunting blind of the invention;

FIG. 4, a view similar to that of FIG. 3, but showing the sheeting material forming the walls removed so the configuration of the poles and base member is clearly visible;

FIG. 5, a pictorial view of a four pole embodiment of a hunting blind of the invention;

FIG. 6, a view similar to that of FIG. 5, but showing the sheeting material forming the walls removed so the configuration of the poles and base member is clearly visible;

FIG. 7, a pictorial view of a second four pole embodiment of a hunting blind of the invention;

FIG. 8, a view similar to that of FIG. 7, but showing the sheeting material forming the walls removed so that the configuration of the poles and base member is clearly visible;

FIG. 9, a fragmentary vertical section taken on the line 9—9 of FIG. 1 and showing the securement of the sheeting material forming the wall to the base members;

FIG. 10, a fragmentary vertical section taken on the line 10—10 of FIG. 1 and showing the securement means securing the sheeting material forming the walls to the poles;

FIG. 11, a fragmentary pictorial view showing the pole securement means attached to the base member;

FIG. 12, a fragmentary pictorial view showing an embodiment of a door closure;

FIG. 13, a fragmentary pictorial view of a pole for use with the invention having central portions thereof broken away;

FIG. 14, a top plan view of the hunting blind of FIG. 1; and

FIG. 15, a top plan view of the hunting blind of FIG. 3.

DETAILED DESCRIPTION OF THE ILLUSTRATED EMBODIMENTS

Figure 14:
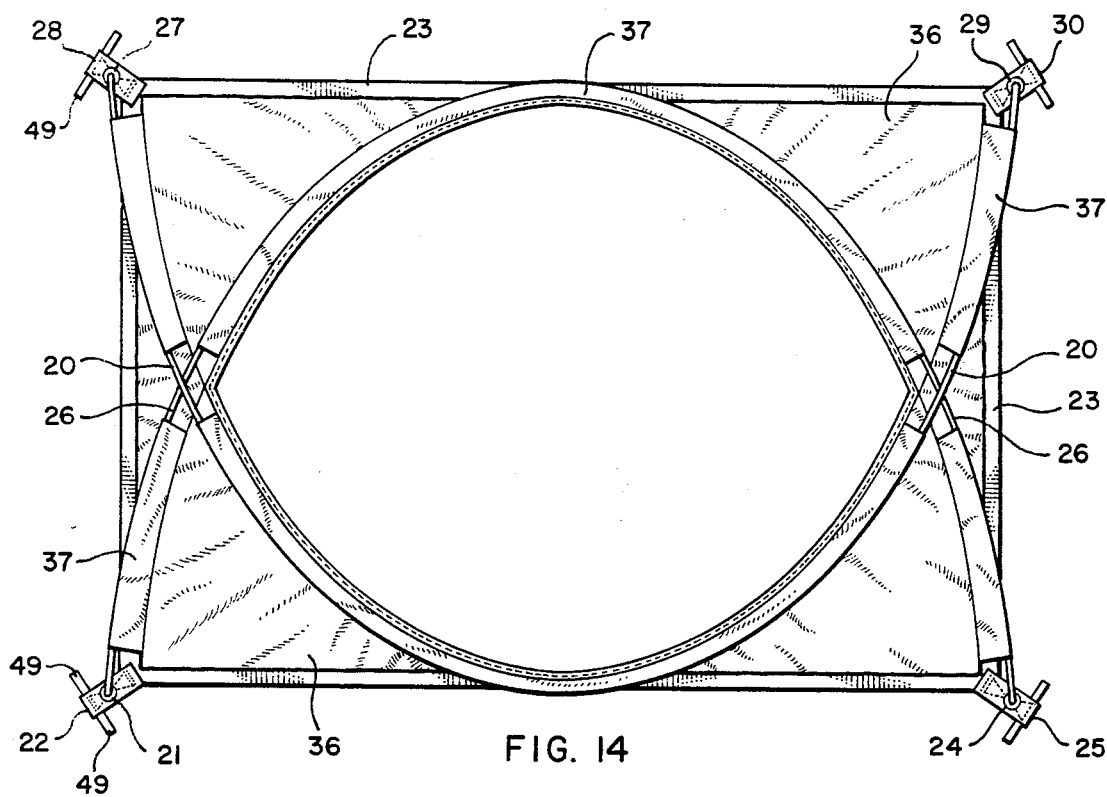

A two pole embodiment of a structure of the invention is shown in FIGS. 1, 2 and 14. A resilient member in the form of a pole 20 has a normally straight configuration, but is bent into an arcuate shape and held in that stressed arcuate shape, as shown, by inserting one end of the pole into a means for securing an end of the resilient member which is shown as a grommet 21 in webbing material 22 secured to base member 23. The other end of pole 20 is held by grommet 24 in webbing material 25 also secured to base member 23. With both ends of pole 20 held in position, pole 20 is held in stressed arcuate position and maintains that arcuate shape.

A second pole 26, similar to pole 20, is held in arcuate, stressed condition by securing one end thereof in grommet 27 in webbing material 28 secured to base member 23 and the other end thereof in grommet 29 in webbing material 30, also secured to base member 23. With the two pole model shown, base member 23 is generally rectangular with respective pole end securing means extending from the corners of the rectangle.

The base member is made of strong flexible material such as polypropelene webbing and preferably, as shown in FIG. 2, merely extends about and defines the perimeter of the structure and does not form a floor. It is important that this base member be strong enough to hold the poles in their stressed position and, since flexible material is used for ease of folding for storage and transport, the base member should extend completely about the perimeter of the structure and form a closed shape. When no floor is used, this base member forms a necessary reinforcing edge for the structure.

The poles and base member preferably should be dimensioned so that when in assembled condition, the poles tightly fit against one another where they cross, as at 34 and 35 in FIG. 2, to tend to hold the poles against relative movement. This, however, is not the only means tending to hold the poles against relative movement when the structure is assembled.

Flexible sheeting material 36 is secured to the base webbing 23 along at least a portion of its bottom edge and has resilient member securing means in the form of loop means 37 along its top edge and sides which secures the sheeting material to poles 20 and 26 to form walls for the structure. The sheeting material is preferably dimensioned to be held taut between the base and the poles and between opposite sides of the poles so that the sheeting material helps to hold the poles in position relative to one another and relative to the base member and sheeting material. Thus, the base, poles, and sheeting material combine to form a self supporting, stable structure. It is also preferred that the sheeting material and resilient member securing means be dimensioned such that the walls assume a substantially vertical orientation with respect to the base member, rather than following the arcuate configuration of the poles. This forms a top opening in the structure as shown in FIG. 14 which is substantially as large as the base of the structure. This is important for a hunting blind because a hunter has to be able to easily stand up in the blind and maneuver himself and his weapon. As large an opening as possible for a given size structure is thus desireable, and it has been found that for normal use in maneuvering a gun, the opening should be at least about three feet in one dimension.

The flexible sheeting material may be a light weight fabric such as nylon or polyester material or a netting material which provides slits to form effectively see through walls for a person inside the structure, but relatively opaque walls for an animal looking at the structure. The material will generally be of a camouflage pattern material so that areas of a single color do not attract the attention of the animal being hidden from. However, in a few instances, it may be desired to use a single color material such as a white material for camouflage in snowy areas. Where camouflage is not important, such as when using the structure for shelter when ice fishing, for example, a black material may be used to absorb heat from the sun and warm the structure.

Figure 9:
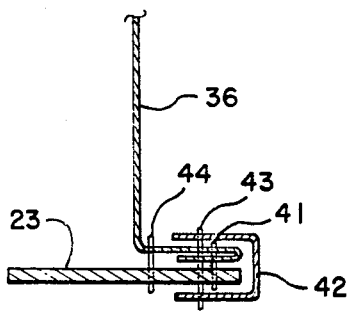
Figure 10:
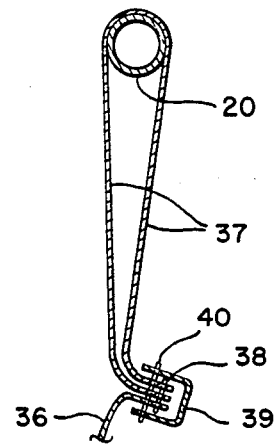

The currently preferred means for securing the sheeting material to the poles is shown in detail in FIG. 10 and comprises loop means 37 of nylon, polyester, or similar material, preferably the same material as the flexible sheeting, sewn to the flexible sheeting material 36 to form a loop to receive pole 20. The loop material may be sewn or otherwise secured to the sheeting material in any suitable manner and it has been found satisfactory for loop 37 to be initially sewn to material 36 by stitching 38. To cover the edges of the loop and sheeting material and help prevent fraying, a twill binder material 39 is sewn in place, as shown, with stitching 40. Stitching 40 not only holds the binder material in place, but forms a second, reinforcing stitch to hold loop 37 to material 36. In a similar manner, see FIG. 9, the flexible sheeting material 36 forming the structure walls is secured to the base member 23 initially by stitching 41. Preferably the sheeting material is folded over, as shown, to provide additional strength at the seam. Binder material 42 is placed over the edge of the base and sheeting material and is sewn in place with stiching 43, again forming a second, reinforcing stitch. A third stitch 44 may be added for additional strength, where desired. It should be noted that generally the walls will be formed of a plurality of individual pieces of sheeting material sewn together along seams such as 36a, FIG. 1, which will generally form the seam for securement of loops 37 also. While FIG. 10 illustrates a seam at the top of a wall with a single piece of wall sheeting material, it should be obvious to a person skilled in the art that for a seam where two pieces of wall sheeting material come together, the additional piece of material could also be included in a similar seam.

Figure 11:
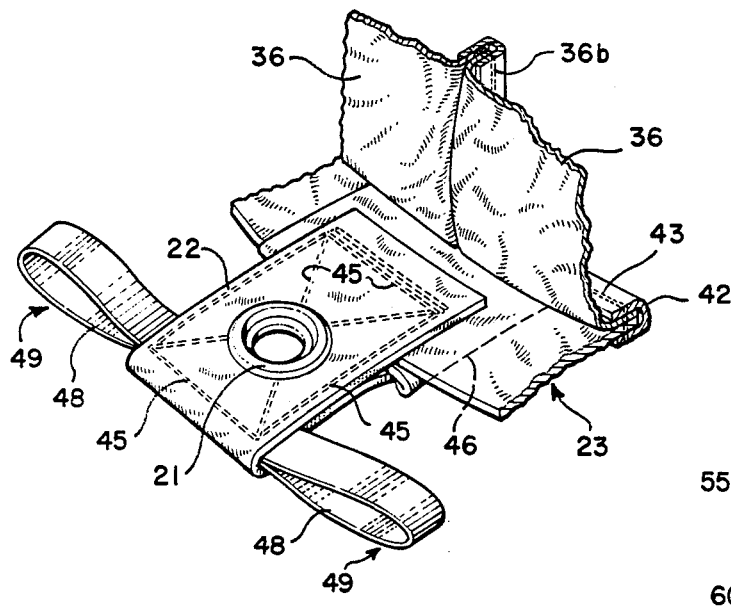

Webbing material such as 22, FIGS. 1, 2 and 11, extending from the corner of base 23 may be folded over as shown in FIG. 11 and sewn together and to base webbing material 23 which is sandwiched between ends of webbing material 22 by stitching 45. Although base 23 could be made up of several pieces of webbing material secured together at the corner of the base, it is preferred that the base be made of a single strip of webbing material, folded over itself as at 46, FIG. 11, to form the corners of the base, and having the two ends of the base strip 23 sewn together where the ends come together, preferably at one of the corners. Grommet 21 is secured in normal manner in webbing 22, and material 48 may be sewn in to provide loops 49, as shown, which may be used, when desired, to secure the structure to the ground by use of stakes or other anchoring means. Such anchoring is not normally required, but may be desireable in particularly windy areas. Two pieces of sheeting material will preferably come together at the corners and be secured at seam 36b.

Figure 13:
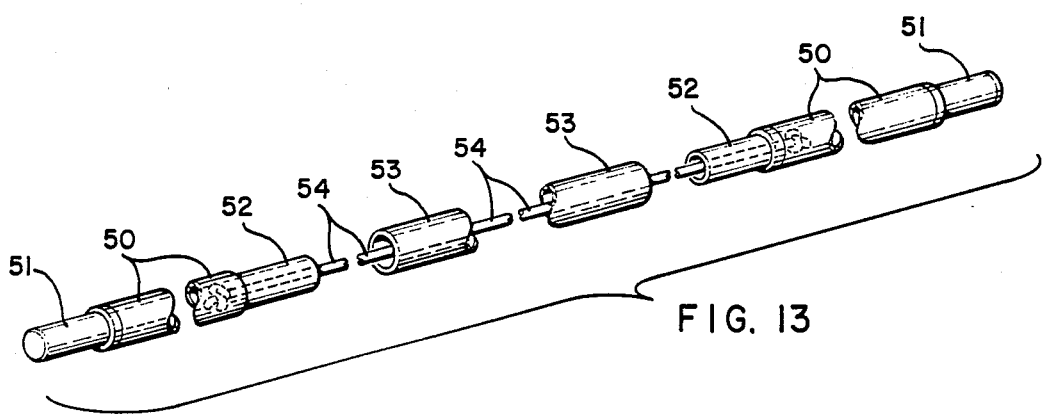

While the resilient poles may each be a single piece of the desired length, such poles would generally be too long to conveniently pack, store, and carry. It is therefore preferred that the poles be assembled of a number of shorter sections which fit together to from the pole of desired length. FIG. 13 shows a prefered construction of a resilient pole for use with the invention wherein the pole sections are tubular, preferably made of high strength aluminum alloy tubing, such as 7075-T9 or 2024-T8 alloy tubing made by Easton Aluminum Inc., Salt Lake City, Utah, and are connected by means of an elastic shock cord so that all pieces of the pole remain together, are not lost, and may be easily assembled.

As shown in FIG. 13, pole end pieces 50 each have end tips 51 of reduced diameter secured to the outer ends therof. These tips are of a diameter to fit through pole end holding grommets such as 21, FIG. 11, while end pieces 50 are of a larger diameter so will not fit through the opening in the grommets. Each end piece 50 has a tubular extension 52 on its end opposite end piece 51, again of reduced diameter and adapted to telescope into mating intermediate pole pieces 53. Any number of intermediate pole pieces may be used depending upon the overall length of the assembled pole desired. Each intermediate pole piece will have a tubular extension similar to extension 52 extending from its inside end to mate with and telescope into the next adjacent intermediate piece. One intermediate piece, however, will have no extensions thereon so that it can mate with the extensions from the intermediate pieces on either side thereof. Secured within each end piece 50 is the end of a shock cord 54 which extends through all intermediate pieces and keeps them together, whether assembled or disassembled, and in proper order.

Figure 12:
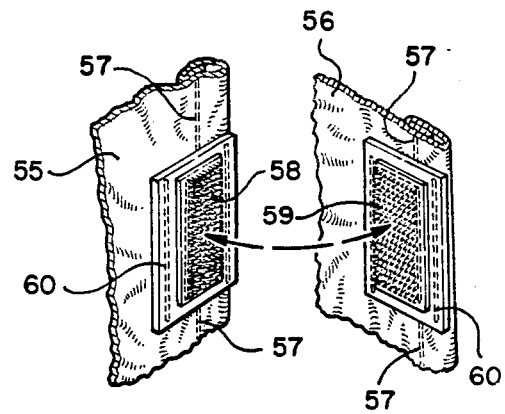

Since the sheet material forming the walls of the structure will usually extend completely about the structure, it is generally necessary to provide a door to enable entry into and exit from the structure. As shown in FIG. 1, the door may conveniently take the form of openable flaps 55 and 56 cut into one wall of the structure so that the flaps overlap at their meeting edges and may be moved to either side to create an opening into the structure. The meeting edges of the flaps are preferably rolled over and stitched as shown at 57, FIG. 12, and mating pieces 58 and 59 of a hook and loop fastening material, such as Velcro, are secured thereto, such as by stitching 60, so that the flaps are held in closed condition when the structure is in use. The bottom edges of the flaps are not secured to the base member for a distance sufficient to allow the desired size opening to be formed.

Figure 15:
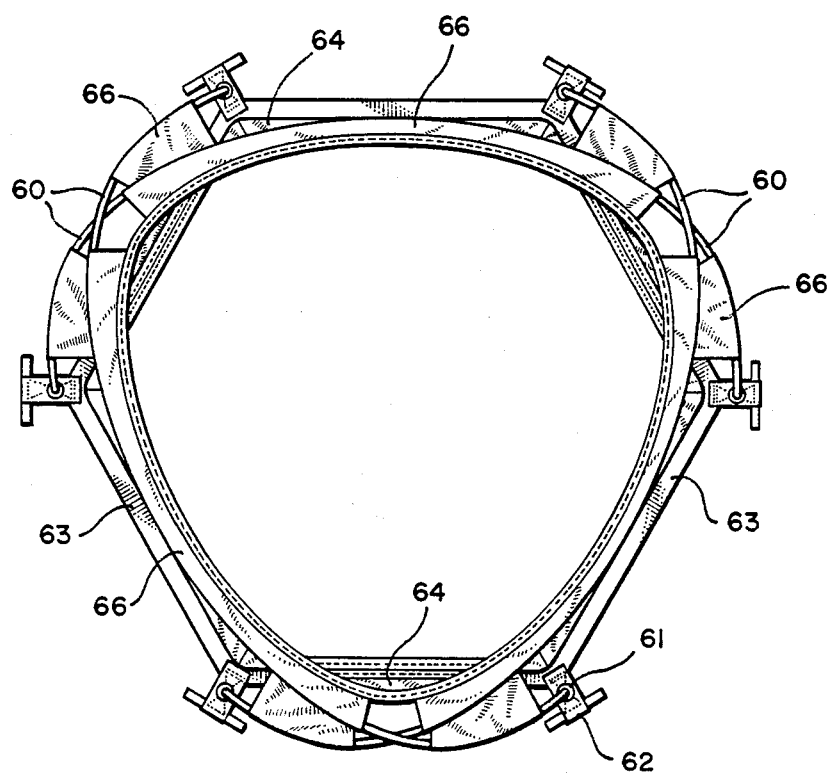

A three pole embodiment of the structure of the invention is shown in FIGS. 3, 4 and 15. As with the two pole model shown in FIGS. 1, 2, and 14, the ends of resilient poles 60 are held in grommets 61 in webbing material 62 secured to base webbing member 63. In this embodiment, base member 63 is in the form of a hexagon which defines the closed perimeter of the structure. Flexible sheeting material 64 is secured to base member 63, except in the area of door flaps 65, and is secured by loops 66 to poles 60 to form substantially vertical walls for the structure. Again, the poles are arranged and held in position substantially over the base member so that the top of the structure is completely open and unobstucted by poles 60 or material 64, and the opening is of size substantially equal to the base of the structure.

When the structure is collapsed by removal of the ends of poles 60 from the grommets 61 and removal of the poles from the loops 66, the material making up the walls, loops, and base of the structure may be compactly stored in a small bag or other case. It has been found convenient to attach a carrying bag 67 to the material forming the walls of the structure such as by a length of material 67a secured at one end to bag 67 and at the other end to seam 64a in sheeting material 64. This permenently attaches bag 67 to sheeting material 64 so that when the structure is assembled, the bag is attached to an inside wall of the structure, preferably near the top of the structure, as shown. In this way, the bag for storage and transport is always available and is not a separate item which may be easily lost. In addition, with the structure assembled, the bag 67 provides a convenient and dry place for storage of items such as shells, food, etc. A pull string 68 is located in normal manner in a pocket about the top of the bag so that the bag may be closed by pulling pull string 68 and held closed by string clamp 69. The use of material 67a to space the bag from the sheeting material makes it easier to move the folded material forming the structure in and out of the bag. A four inch length for material 67a has been found satisfactory. For a normal one man, three pole blind structure, with the material folded and placed in the bag, the bag will be about ten inches by about five inches in size and weigh about two pounds. The poles removed from the structure will preferably be broken down into sections as shown in FIG. 13, each section being about eighteen inches long, and are stored in a separate bag or other case provided for the poles. Although the poles and material could be stored in the same case, because of the length of the pole sections, it will generally be more convenient to store and transport them separately. With the three pole embodiment shown, the three poles, when broken down, will usually fit into a bag about 18" long and two and one-half inches in diameter which will weigh about one pound. Since the bag or case for the poles will probably be separate from the structure, when the structure is assembled, the bag for the poles may be easily and conveniently stored in bag 67 to prevent it from getting lost.

Figure 5:
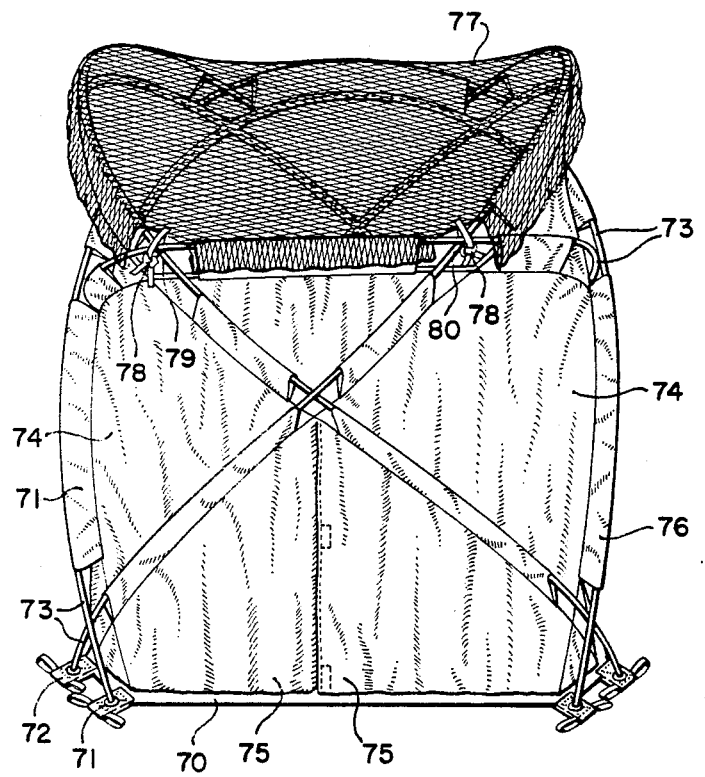
Figure 6:
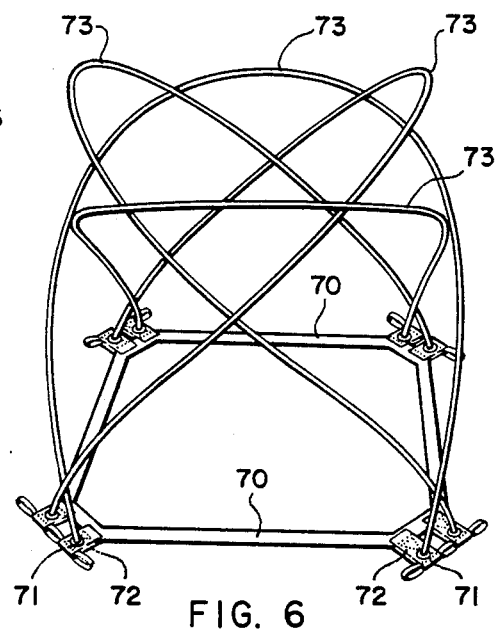

FIGS. 5 and 6 show an embodiment of a four pole version of the structure of the invention. With the embodiment shown in FIGS. 5 and 6, the base member 70 is substantially square in configuration with two pole end securing means, each comprising grommets 71 and webbing 72, secured to the base at each corner. Four poles 73 are positioned as shown in grommets 71 and held in stressed, arcuate position. Sheeting material 74 is secured to base member 70, except in the area about door flaps 75, and is secured to poles 73 by loops of material 76, so as to form walls for the structure.

In many instances, particularly when hunting ducks and geese, it is desireable to cover the open top of the structure until it is time to actually shoot. For this purpose, a net 77 may be placed over the open top of the structure and preferably will have ties 78 at one end thereof which may be tied to the structure such as to where the poles cross as at 79 and 80. In this manner, the net 77 may be easily thrown from its position over the structure opening but will remain secured to the structure and hang down one side thereof from ties 78. This keeps net 77 off the ground and out of any water if the blind is set up in water or on marsh land as will generally be the case in duck and geese hunting, and also makes it easy to pull the net back over the top of the blind if and when desired. While the net is illustrated in FIG. 5, such net may be used with any embodiment of the blind.

Figure 7:
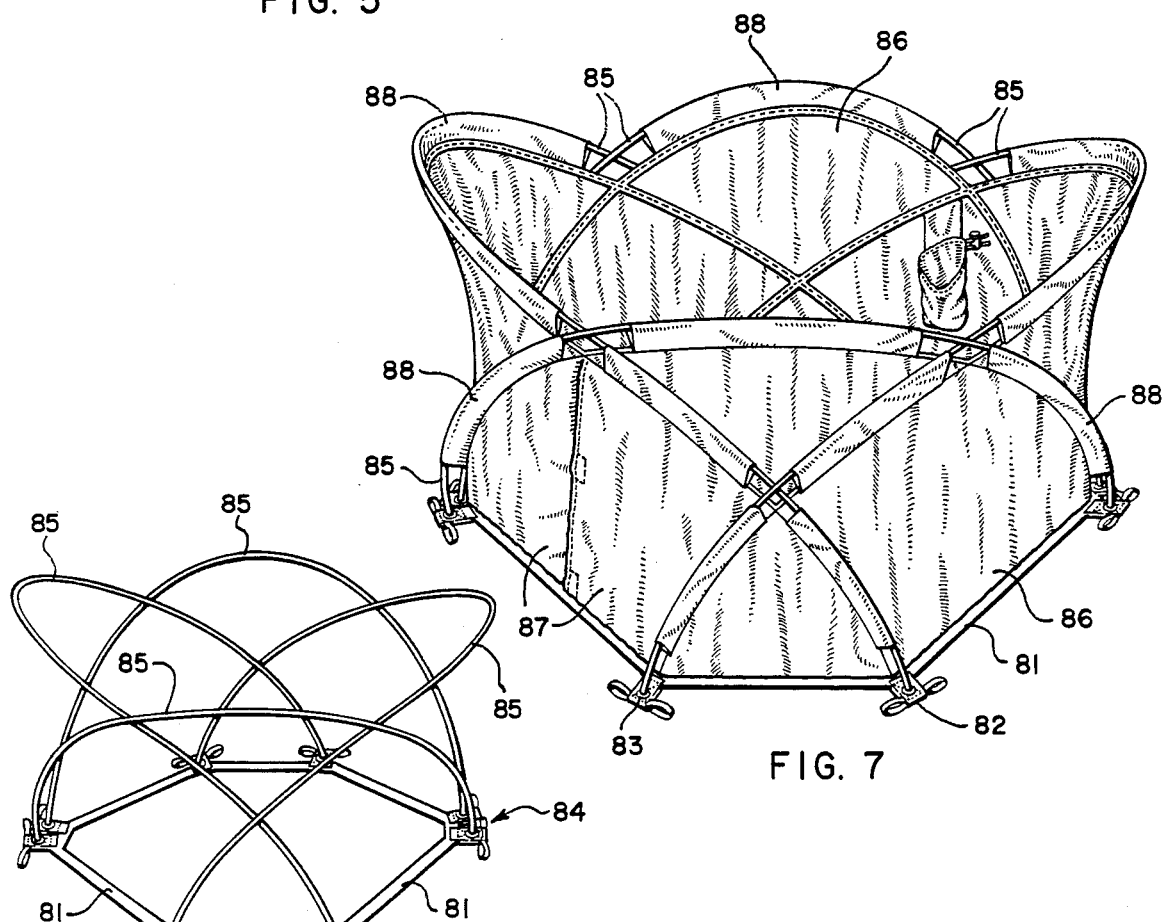
Figure 8:
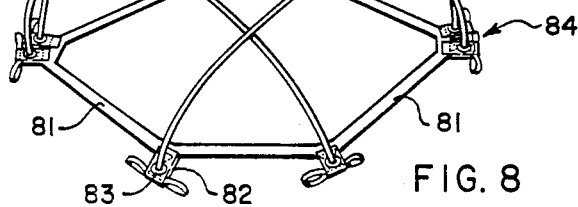

A second embodiment of a four pole version of the structure is shown in FIGS. 7 and 8. With this embodiment, the base member 81 takes the form of a hexagon with pole end securing means, each comprising grommets 82 and webbing material 83, secured to the corners of the hexagon. One set of opposite corners will have two pole end securing means extending therefrom as shown in FIG. 8 at 84. Four poles 85 are bent and arranged as shown. Again, sheeting material 86 is secured to the base, except in the area of the door flaps 87, and loops 88 secure the sheeting material to the poles 85 to form the structure walls.

While two, three, and four pole versions of the structure are shown, structures having more than four poles could be used. The more poles used, the more stable the resulting structure, but the more complicated to assemble and the more expensive the materials. The two pole embodiment shown in FIGS. 1, 2, and 14 provides a small, light structure with sufficient stability to be practical and usable in many situations. However, such structure will tend to sway along its longer dimensions. The three pole embodiment shown in FIGS. 3, 4, and 15 is a good compromise between stability and simplicity. It provides a good size, stable structure, and is easy to assemble, disassemble, and transport. As such, the three pole embodiment will generally be preferred in most situations. A one man model of the three pole embodiment has sides of the base hexagon about twenty-six inches long and a height to the top of the arc of each pole of about forty-six inches. The distance across the base hexagon between opposite corners is about fortynine inches, and the poles are each about 130 inches long. The above dimensions are merely an example of one model blind structure made according to the invention and dimensions can vary greatly.

While the resilient poles used with the invention have been described as being made of a high strength aluminum alloy, the poles could be made of various materials such as fiberglass or other composite and may be hollow tubes or may be solid. When solid poles are used, the sections may easily be joined by using sleeves which fit over abutting ends of the pole sections. The convenience of having all pole sections joined by an internal shock cord, however, will not be available with solid poles. Fiberglass poles produced by a process known as poltrusion which produces a thick walled fiberglass hollow tube may be used and may include the convenience of the inner shock cord. Such pole sections are joined by sleeves that fit over abutting ends of the sections, and are more economical than the aluminum poles.

It has been indicated that the structure preferably is made with an open bottom. This is because hunting blinds for duck hunting are usually used in marshy areas or in water where a floor would not be desireable. Further, the blind structure has various other uses such as shelter for sports such as ice fishing, or for privacy such as for outdoor showers or to surround a latrine. Floors are not desired for these uses either. However, a floor, if desired, could be provided. Windows, if desired, could also be provided in the structure.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A portable, collapsible, walled structure suitable for a hunting blind or the like, comprising a base member made of a flexible material which defines the closed perimeter of the structure; flexible sheet material secured to at least a portion of the base member and configured to form walls for the structure extending at least partially about the perimeter of the structure; means for securing ends of resilient members to the base member at selected predetermined locations; a plurality of resilient members, respective ends of each member being adapted to be secured to different selected end securing means to cause bending of said resilient members to form an arcuate shape; and resilient member securing means secured to the flexible sheeting material at preselected locations and effective to secure said sheeting material to the resilient members to thereby support said sheeting material in substantially taut condition to form substantially vertical walls of the structure, leaving the top of the structure open and unobstructed by said resilient members and said sheeting material, said walls effective supporting the structure and stabilizing said resilient members and holding them in position relative to one another and relative to said base member and said sheeting material whereby a stable, open top structure is formed with the top opening approximately the same size as the base of the structure.

2. A portable, collapsible, walled structure according to claim 1, wherein the base member forms a strip about the perimeter of the bottom of the structure.

3. A portable, collapsible, walled structure according to claim 2, wherein the strip is formed of webbing material.

4. A portable, collapsible, walled structure according to claim 3, wherein the webbing material is a polypropelene webbing material.

5. A portable, collapsible, walled structure according to claim 1 wherein the structure is formed with two poles.

6. A portable, collapsible, walled structure according to claim 5, wherein the base of the structure is in the form of a rectangle.

7. A portable, collapsible, walled structure according to claim 1, wherein the structure is formed with three poles.

8. A portable, collapsible, walled structure according to claim 7, wherein the base of the structure is in the form of a hexagon.

9. A portable, collapsible, walled structure according to claim 1, wherein the structure according to claim 1, wherein the structure is formed with four poles.

10. A portable, collapsible, walled structure according to claim 9, wherein the base of the structure is in the form of a square.

11. A portable, collapsible, walled structure according to claim 9, wherein the base of the structure is in the form of a hexagon.

12. A portable, collapsible, walled structure according to claim 1, wherein the poles are formed of a plurality of pole sections that are assembled together to form a pole.

13. A portable, collapsible, walled structure according to claim 12, wherein the poles are made of an aluminum alloy.

14. A portable, collapsible, walled structure according to claim 12, wherein the poles are made of fiberglass.

15. A portable, collapsible, walled structure according to claim 1, wherein there is additionally included attached to the structure a bag for holding the base member and sheeting material when the structure is in its collapsed condition.

16. A portable, collapsible, walled structure according to claim 15, wherein the bag is secured to the sheeting material so that when the structure is in assembled condition, the bag hangs from the sheeting material near the top of the structure on the inside of the structure.

17. A portable, collapsible, walled, structure according to claim 15, wherein the bag is attached to the structure by means of a spacer so that the bag is spaced from the structure a desired distance to more easily enable the sheeting material and base to be placed in the bag when in collapsed condition.

18. A portable, collapsible, walled structure according to claim 1, wherein there is additionally included netting material adapted to be place over the open top of said structure.

19. A portable, collapsible, walled structure according to claim 18, wherein the netting material is secured to the top of the structure at one side thereof so that such netting material may be thrown off the top of the structure to the side where it is secured and hang down that side of the structure.

* * * * *